(12) United States Patent
Hama (10) Patent No.: US 7,373,807 B2
(45) Date of Patent: May 20, 2008

(54) DRIVE UNIT

(75) Inventor: Nobuyuki Hama, Higashi Hiroshima (JP)

(73) Assignee: Mitutoyo Corporation, Kanagawa (JP)

( * ) Notice: Subject to any disclaimer, the term of this patent is extended or adjusted under 35 U.S.C. 154(b) by 295 days.

(21) Appl. No.: 11/359,526

(22) Filed: Feb. 23, 2006

(65) Prior Publication Data
US 2006/0196255 A1 Sep. 7, 2006

(30) Foreign Application Priority Data
Mar. 4, 2005 (JP) .............................. 2005-061343

(51) Int. Cl.
*G01B 5/28* (2006.01)

(52) U.S. Cl. ...................................................... 73/105

(58) Field of Classification Search ...................... None
See application file for complete search history.

(56) References Cited

U.S. PATENT DOCUMENTS

| 4,807,152 | A | 2/1989 | Lane et al. | |
|---|---|---|---|---|
| 5,974,679 | A * | 11/1999 | Birang et al. | ................ 33/553 |
| 6,397,667 | B1 * | 6/2002 | Fujii et al. | .................... 73/105 |
| 6,425,285 | B1 | 7/2002 | Fujii et al. | |
| 6,453,730 | B2 | 9/2002 | Takemura | |
| 7,065,893 | B2 * | 6/2006 | Kassai et al. | ................. 33/554 |

FOREIGN PATENT DOCUMENTS

| JP | A 2001-133249 | 5/2001 |
|---|---|---|
| JP | A 2002-71346 | 3/2002 |

* cited by examiner

*Primary Examiner*—Robert Raevis
(74) *Attorney, Agent, or Firm*—Oliff & Berridge, PLC (57) ABSTRACT

A drive unit is provided that is capable of providing a high-accuracy measurement operation while suppressing a posture change of a detector even if the detector is moved. The drive unit includes a cross section of horizontally-oriented-U-shape guide rail provided to a frame, and the outside to be parallel to the movement direction of a roughness detector; a slider formed to be able to freely slide along the guide rail, and configures a frame being rectangular in cross section to include a detector therein; biasing member that biases the slider against the guide rail; and drive device that moves the slider along the guide rail. The drive unit is configured to include a motor, a ball screw axis to be driven by the motor, and a nut member that is screwed to the ball screw axis, and is coupled to the slider. The ball screw axis is disposed in the vicinity of the substantial center of sliding surfaces of the slider.

8 Claims, 8 Drawing Sheets

DRIVE UNIT

BACKGROUND

JP-A-2001-133249 and JP-A-2002-71346 disclose a drive unit and a surface texture measurement instrument. The drive unit moves along the surface of a measurement work, and includes a detector that measures the surface roughness, the surface rising and falling, the contour, or other features of the measurement work.

The drive unit of JP-A-2001-133249 is configured to include: a guide rail having the cross section of downwardly-oriented substantially-U-shape with two reference surfaces, which are disposed parallel to the movement direction of the detector with an angle of 90 degrees therebetween; a slider also having the cross section of downwardly-oriented substantially-U-shape, being fit to the outside of the guide rail to be able to freely swing, and keeps hold of the detector in the guide rail; and drive device for moving the slider along the guide rail. The drive device is configured to include: a motor; a feed screw axis that is rotated by the motor; and a feed piece screwed to the feed screw axis and coupled to the slider. Therein, the feed screw axis is disposed at the position above the slider to be parallel to the guide rail.

The surface texture measuring instrument of JP-A-2002-71346 is configured to include: a guide; a slider formed to configure a rectangular frame in cross section to include the guide therein, is fit to the outside of the guide to be able to freely slide, and is keeping hold of a detector on the bottom surface; and drive device for moving the slider along the guide rail. The drive device is configured to include: a motor; a ball screw that is rotated by the motor; and a nut screwed to the ball screw and coupled to the slider. Therein, the ball screw is disposed at the position above the slider to be parallel to the guide rail.

SUMMARY

In both the drive unit of JP-A-2001-133249 and the surface texture measuring instrument of JP-A-2002-71346, the feed screw axis and the ball screw for use of moving the slider are disposed at the positions above the slider, which is supported by the guide rail (or the guide) to be able to freely slide, i.e., the feed screw axis and the ball screw are disposed at the positions at which the center of gravity of the slider is off. Therefore, a moment force is applied to the slider, thereby easily causing the slider to change in posture with respect to the guide rail (or the guide). Once the slider changes in posture, it will appear as a measurement deviation at the time of measuring the surface roughness, the surface rising and falling, the contour, or others. As a result, there is a drawback of not leading to a measurement operation with a high accuracy.

An object of the present disclosure is to provide a drive unit that may provide assurances of a measurement operation with a high accuracy while suppressing any possible posture change to be occurred to a detector even if the detector is moved.

A drive unit is provided to move a detector along the surface of a measurement work. The drive unit may include a frame; a guide rail that is provided to the frame, and is provided with two guide surfaces on the outside being parallel to the movement direction of the detector with a predetermined angle therebetween; a slider that is provided to be able to freely slide along the guide rail, and is keeping hold of the detector; a biasing device that biases the slider toward the guide surfaces of the guide rail; and a drive device that moves the slider along the guide rail. The slider may be provided with two sliding surfaces opposing to the two guide surfaces, and is formed to have the shape of housing therein the guide rail, and the drive device may include a motor, a feed screw axis to be driven by the motor, and a nut member that is screwed to the feed screw axis and coupled to the slider, and the feed screw axis is disposed on the inner side of the guide rail and inside of the slider.

The stylus may have the shape of housing therein the guide rail, when the guide rail is cut in the direction orthogonal to the longitudinal direction, including not only the shape enclosing around the cross sectional contour of the guide rail but also the shape covering most of the cross sectional contour thereof. Moreover, the feed screw axis is not limited to the ball screw axis, but may also be a screw axis formed by disposing a normal screw along the outer rim surface.

With such a configuration, when the motor of the drive device is driven, in response to the rotation of the feed screw axis, the nut member is moved to the axial direction of the feed screw axis. Accordingly, the slider is moved along the guide rail. That is, the detector attached to the slider is moved along the surface of a measurement work, and as a result, the surface texture of the measurement work may be detected by the detector.

According to such a disclosure, the moment to be produced to the slider may be suppressed to a further degree than conventional due to the configuration that the feed screw axis is disposed on the inner side of the guide rail and inside of the slider. Therefore, even if the detector is moved, any possible posture change to be occurred to the detector may be suppressed to possibly minimum so that a measurement operation may be performed with assurances of high accuracy.

What is more, the guide rail is formed with two guide surfaces, which are so disposed as to form a predetermined angle therebetween, being both parallel to the movement direction of the detector. The slider is formed with two sliding surfaces, which are opposing to the two guide surfaces. Therefore, any posture change observed in the direction orthogonal to these two guide surfaces and the sliding surfaces, e.g., four directions of up and down, and right and left, may be suppressed to possibly minimum. Accordingly, even if the measurement is performed by changing the posture of the detector, the straightness accuracy may be guaranteed while the posture change of the slider is suppressed so that the measurement operation may be performed with accuracy.

With the drive unit of the present disclosure, preferably, the guide rail is in the cross section of horizontally-oriented substantially-U-shape. The slider is formed to configure a rectangular frame in cross section to include therein the guide rail, and four inner surfaces of the frame being rectangular at the end surface are provided to the guide rail to be able to freely slide. The feed screw axis is disposed in the vicinity of the substantial center of the four sliding surfaces of the guide rail and the slider.

According to such a disclosure, the four inner surfaces of the end-surface rectangular frame of the guide rail may freely slide, and the feed screw axis is disposed in the vicinity of the substantial center of the four sliding surfaces of the guide rail and the slider. Therefore the moment to be produced to the slider is cancelled out, and as a result, any posture change to be occurred to the detector may be suppressed with more certainty.

With the drive unit of the present disclosure, preferably, the biasing member may include: a leaf spring whose one end is fixed to the slider; a sliding member retained by the other end of the leaf spring, and abuts the guide rail; and a biasing force adjustment mechanism that is provided on the side opposite to the sliding member with the leaf spring therebetween for bias application in such a direction that the sliding member abuts the guide rail, and is capable of adjusting the biasing force, and is provided on the side surface opposite to each of the two sliding surfaces of the slider.

According to such a disclosure, by the leaf spring fixed to the slider causing the slider member to abut the guide rail, the slider is biased in such a manner that the two sliding surfaces of the slider follow the two guide surfaces of the guide rail so that the slider is moved with reference to the two guide surfaces of the guide rail. Therefore, accurately assuring the straightness of the two guide surfaces accordingly provides assurances of the straightness accuracy of the slider, i.e., the detector.

What is more, the configuration includes the biasing force adjustment mechanism that is capable of adjusting the biasing force that biases the sliding member in the direction abutting the guide rail. Accordingly, through adjustment of the biasing force, the pressure of the sliding member abutting the guide rail may be arbitrarily set. Herein, the sliding member may be made of a material of lower friction coefficient such as Teflon (trade mark). With this being the case, even if the slider is biased toward the guide rail by the biasing device including the leaf spring and the sliding member, the friction force to be produced between the surface of the sliding member abutting the guide rail and the guide rail is not so high. Therefore, the slider may be made to slide smoothly along the guide rail.

With the drive unit of the present disclosure, the slider and the nut member are preferably coupled together via a universal joint that allows a small displacement observed to the nut member in the axial-orthogonal direction of the feed screw axis.

According to such a disclosure, the slider and the nut member are coupled together via the universal joint that allows a small displacement observed to the nut member in the axial-orthogonal direction of the feed screw axis. With such a configuration, any effects caused by the swing rotation of the feed screw axis may be absorbed by the universal joint, and are not transmitted to the slider. Also in this respect, the straightness accuracy may be guaranteed for the slider.

With the drive unit of the present disclosure, the detector is preferably provided with: a detector main body; a stylus that is supported by the detector main body to be able to freely swing, and from its tip end, a sensing pin is protruding at substantially 90 degrees; and a detection section that detects any swinging motion of this stylus. It is also preferable to include a detector rotation mechanism that rotates the detector about an axis being substantially parallel to the movement direction of the detector.

According to such a disclosure, the detector rotation mechanism is provided for rotating the detector about an axis being substantially parallel to the movement direction of the detector so that the sensing pin may be changed in orientation depending on the measurement portion of a measurement work. For example, the sensing pin may be changed to orient downward, sideward, diagonally downward, or others. This thus enables the roughness measurement at any arbitrary position of the inner radius surface of a hole, the roughness measurement of a vertical end surface, the dimension measurement between vertical surfaces, or the like.

These and other features and details are described in, or are apparent from, the following detailed description.

BRIEF DESCRIPTION OF THE DRAWINGS

Various exemplary details of systems and methods are described, with reference to the following figures, wherein.

DETAILED DESCRIPTION OF EMBODIMENTS

Figure 1:
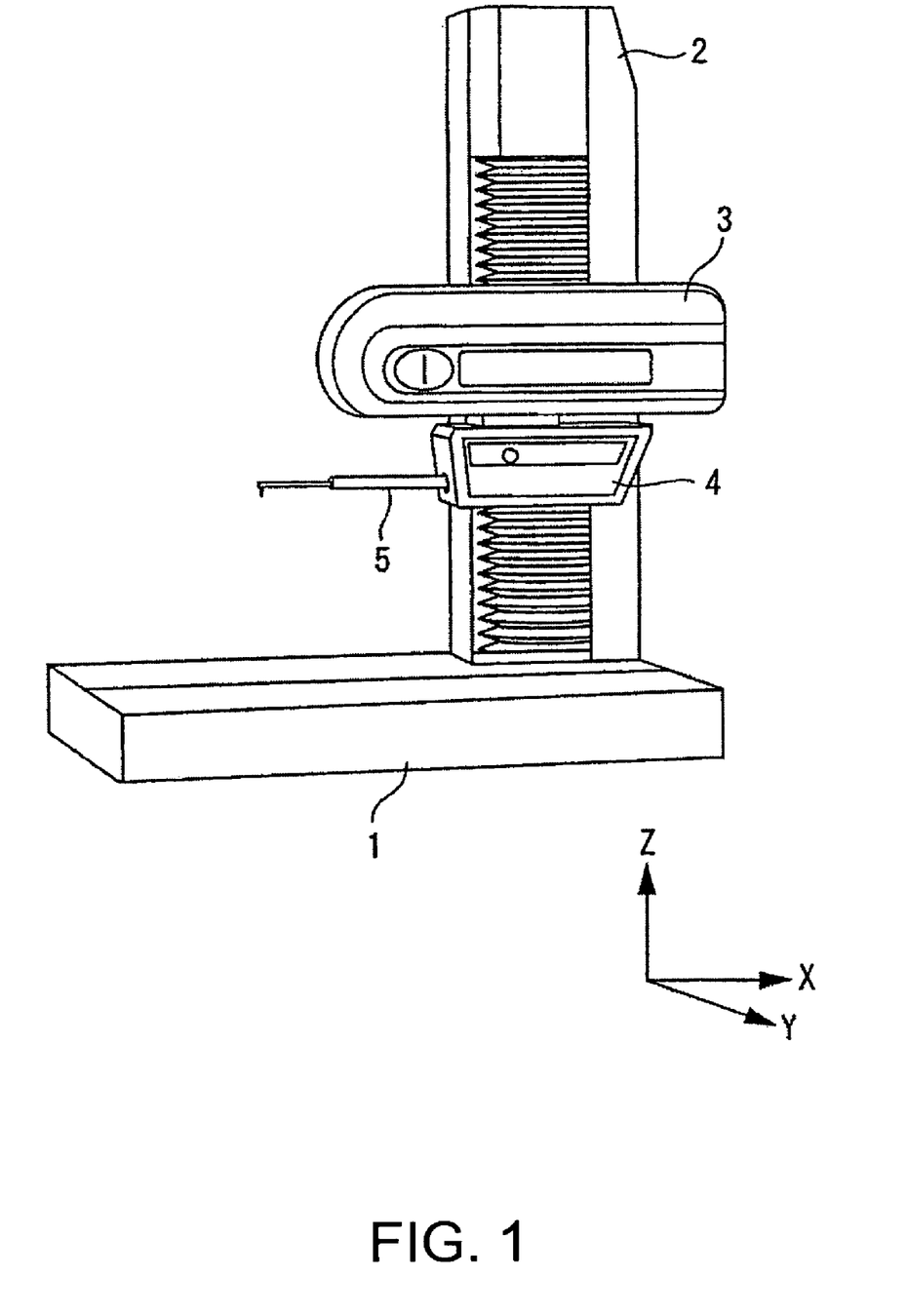
FIG. 1 is a perspective view of an exemplary surface roughness measuring Instrument.

FIG. 1 is a perspective view of an exemplary surface roughness measuring instrument. This surface roughness measuring instrument may include a base 1, a support 2 provided to stand on the base 1, an X-axis drive unit 3 provided to the support 2 to be able to move in the vertical direction, a detector rotation unit 4 serving as a detector rotation mechanism that is moved by the X-axis drive unit 3 into a direction (X-axis direction) orthogonal to the support 2, and a roughness detector 5 that is rotated by the detector rotation unit 4 about an X-axis.

Figure 2:
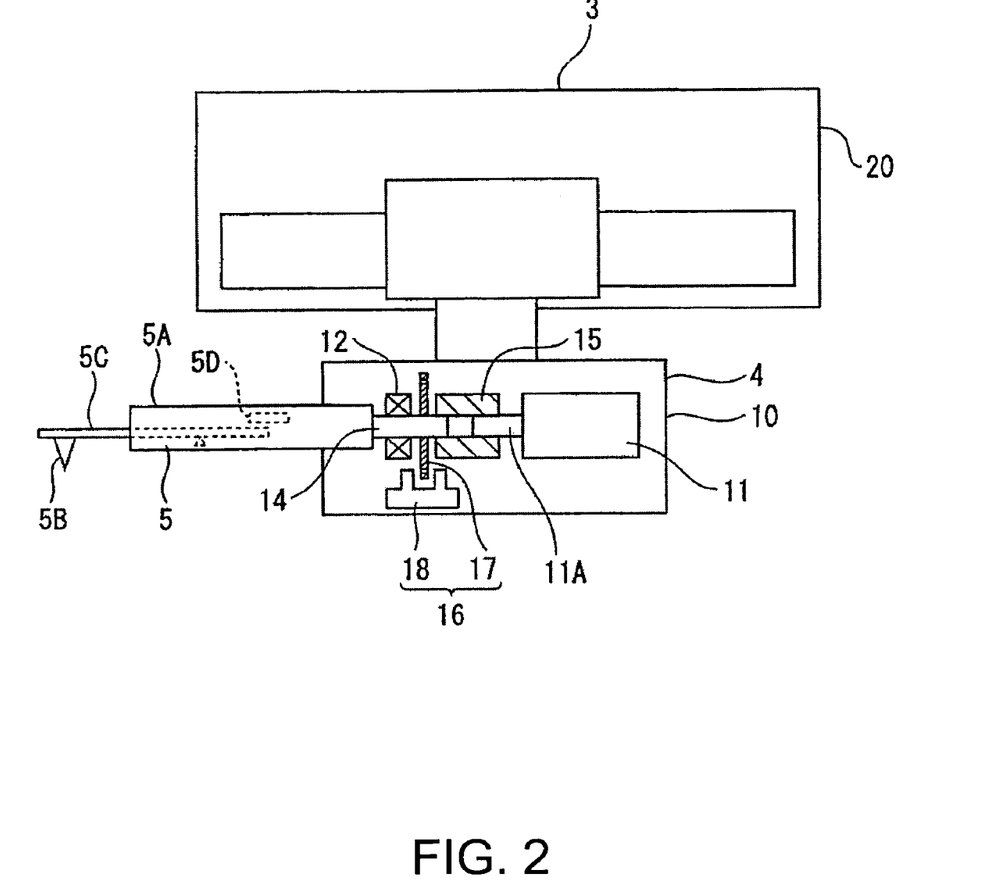
FIG. 2 is a schematic view of an exemplary detector rotation unit.

FIG. 2 is a schematic diagram showing the detector rotation unit 4. The detector rotation unit 4 may include a cabinet 10 that is moved by the X-axis drive unit 3 in the X-axis direction, a motor 11 fixed inside of the cabinet 10, a rotation axis 14 that is supported inside of the cabinet 10 to be rotatable on the same axis as an output axis 11A of the motor 11 via a bearing 12, and keeping hold of the roughness detector 5 at the tip end thereof, an axis joint 15 that couples together the rotation axis 14 and the output axis 11A of the motor 11, and an angle detection sensor 16 that detects the rotation angle position of the rotation axis 14 (the roughness detector 5).

The angle detection sensor 16 may include a rotation disk 17 including transparent holes at a regular pitch along the outer rim fixed to the rotation axis 14, and a detection head 18 including a light-emitting element and a light-receiving element, those of which are so disposed as to oppose to each other with the rotation disk 17 therebetween.

The roughness detector 5 may include a detector main body 5A, a stylus 5C that is supported by the detector main body 5A to be able to freely swing, and from its tip end, a sensing pin 5B is protruding at substantially 90 degrees, and a detection section 5D that detects any swinging motion of this stylus 5C.

Figure 3:
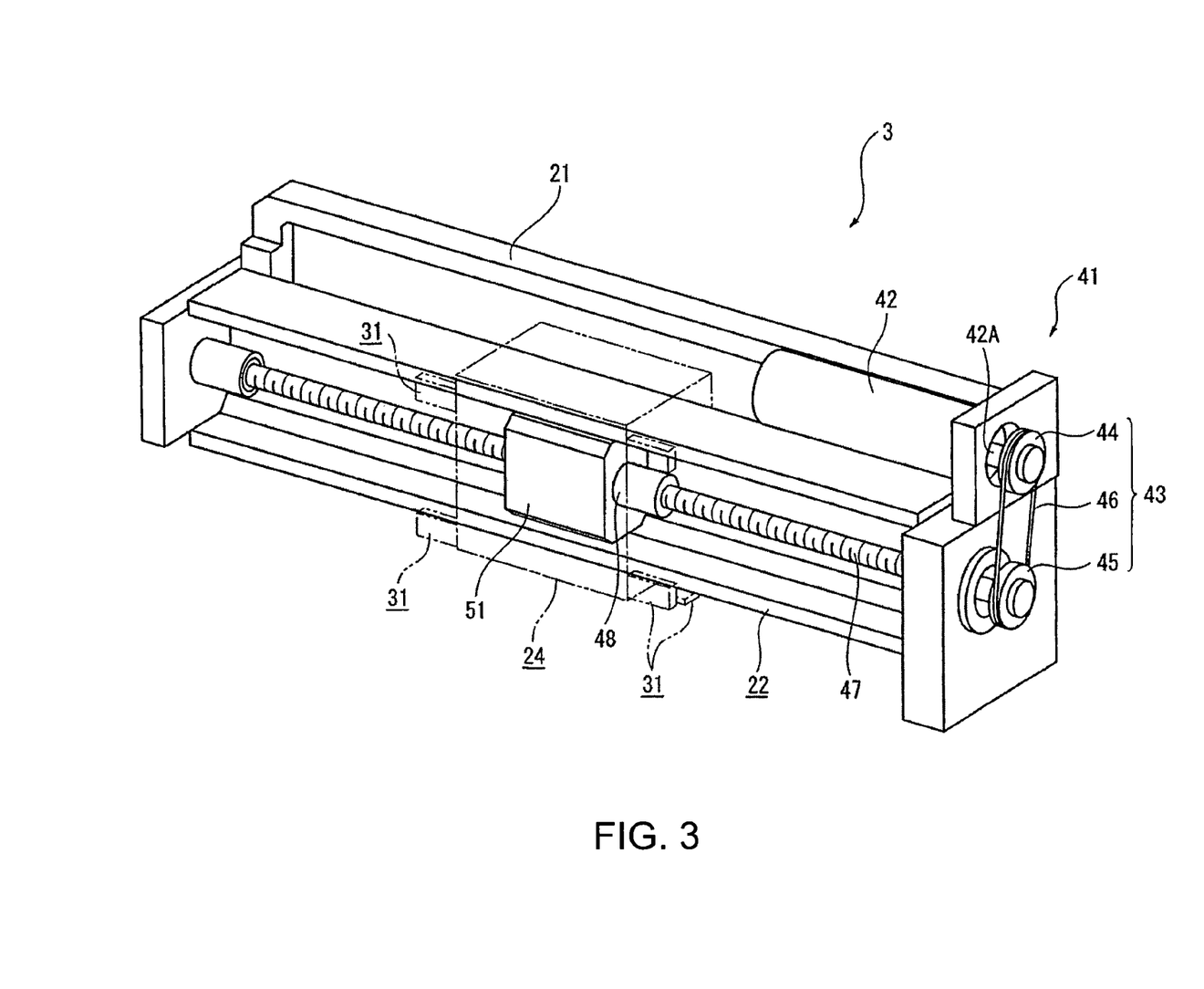
FIG. 3 is a perspective view of an exemplary X-axis drive unit.

FIG. 3 is a perspective view of the X-axis drive unit 3. The X-axis drive unit 3 may include a cabinet 20 provided along the support 2 to be able to move in the vertical direction (refer to FIG. 2), a frame 21 fixed inside of the cabinet 20, a guide rail 22 whose both ends are supported by the frame 21, a slider 24 provided along the guide rail 22 to be able to freely swing, and is keeping hold of the detector rotation unit 4, biasing device 31 for biasing the slider 24 in such a direction that the sliding surface of the slider 24 abuts the guide surface of the guide rail 22, and drive device 41 for moving the slider 24 along the guide rail 22.

Figure 4:
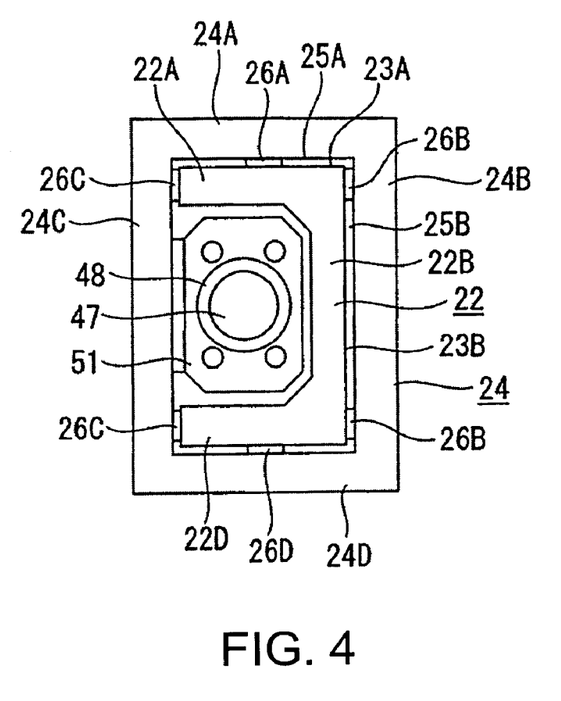
FIG. 4 is a vertical cross sectional view of the X-axis drive unit of FIG. 3.

The guide rail 22 may have the horizontally-oriented U-shape in cross section with two guide surfaces, which are so disposed as to form a predetermined angle therebetween, being both parallel to the movement direction of the roughness detector 5. For example, as shown in FIG. 4, the guide rail is formed to have the horizontally-oriented U-shape in cross section with an upper wall 22A, a side wall 22B that extends downward at 90 degrees from an end of the upper wall 22A to be a piece therewith, and a lower wall 22D that extends in the horizontal direction from a lower end of the side wall 22B to be parallel to and be a piece with the upper wall 22A. On the outer side surface of the upper wall 22A, a first guide surface 23A is formed, and on the outer side surface of the side wall 22B, a second guide surface 23B is formed. The first guide surface 23A and the second guide surface 23B are with assurances of straightness accuracy.

The slider 24 may configure a rectangular frame in cross section including the guide rail 22 therein. For example, as shown in FIG. 4, the slider is formed to configure a vertically-longer rectangular frame in cross section, including an upper wall 24A, side walls 24A and 24C, and a lower wall 24D. The inner surface of the upper wall 24A and the inner surface of the side wall 24B are formed with two sliding surfaces opposing to the two guide surfaces 23A and 23B of the guide rail 22, i.e., a first sliding surface 25A and a second sliding surface 25B, respectively.

Between the inner surfaces of the slider 24, i.e., those of the upper wall 24A, the side walls 24B and 24C, and the lower wall 24D, and the outer surfaces of the guide rail 22, i.e. those of the upper wall 22A, the side wall 22B, and the lower wall 22D, sliding members 26A, 26B, 26C, and 26D are disposed, respectively. Herein, between the inner surface of the upper wall 24A of the slider 24 and the outer surface of the upper wall 22A of the guide rail 22, the sliding member 26A is provided at the center in the width direction. Between the inner surface of the lower wall 24D of the slider 24 and the outer surface of the lower wall 22D of the guide rail 22, the sliding member 26D is provided at the center in the width direction. Between the inner surface of the side wall 24B of the slider 24 and the outer surface of the side wall 22B of the guide rail 22, the sliding member 26B is provided above the other sliding member 26B. Between the inner surface of the side wall 24C of the slider 24 and the end surface of the upper wall 22A of the guide rail 22, the sliding member 26C is provided, and between the inner surface of the side wall 24C of the slider 24 and the end surface of the lower wall 22D, the other sliding member 26C is provided.

Figure 5:
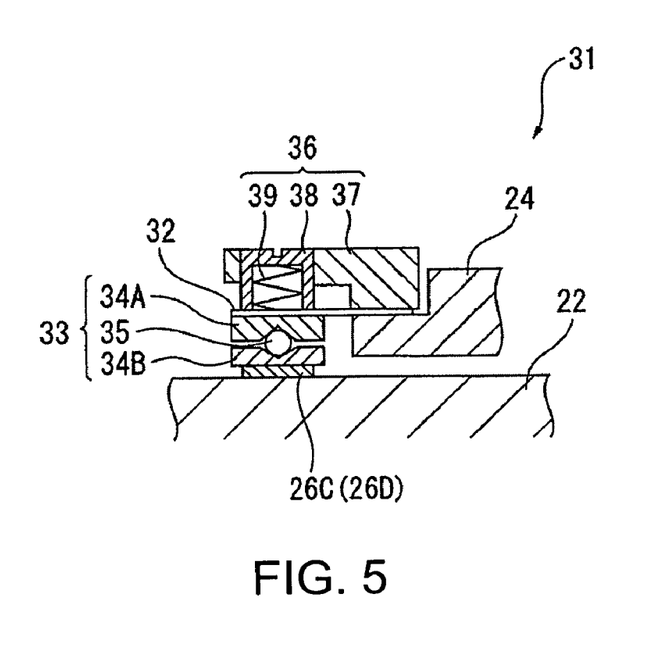
FIG. 5 is a diagram showing an exemplary biasing device for use in the X-axis drive unit of FIG. 3.

The biasing device 31 may be provided to the surfaces opposing to the two sliding surfaces 26A and 26B of the slider 24, i.e., the lower wall 24D and the side wall 24C. As shown in FIG. 5, the biasing members 31 are each configured to include a leaf spring 32 whose one end is fixed to the slider 24, the sliding members 26C and 26D provided to the other end of the leaf spring 32 via a swing mechanism 33, and a biasing force adjustment mechanism 36 that is provided on the side opposite to the sliding members 26C and 26D with the leaf spring 32 therebetween to bias the leaf spring 32 in such a direction that the sliding members 26C and 26D abut the guide rail 22, and is capable of adjusting the biasing force.

The swing mechanism 33 may be disposed between the leaf spring 32 and the sliding members 26C and 26D, and is configured to include two plates 34A and 34B forming a conical groove at the center of their inner surfaces facing to each other, and a steel ball 35 that is accommodated in the conical groove of the two plates 34A and 34B.

The biasing force adjustment mechanism 36 may include an attachment member 37 fixed to the slider 24, an adjustment screw 38 screwed into the attachment member 37, and a spring 39 housed inside of the adjustment screw 38.

The drive device 41 may include a motor 42 that is fixed to the frame 21 to be parallel to the guide rail 22, a ball screw axis 47 fixed to the frame 21 to be parallel to the guide rail 22, and serves as a feed screw axis that transmits the rotation of the motor 42 via a rotation transmission mechanism 43, and a nut member 48 that is screwed into the ball screw axis 47, and coupled to the slider 24 via a universal joint 51.

The rotation transmission mechanism 43 may include a pulley 44 attached to an output axis 42A of the motor 42, a pulley 45 fixed to one end of the ball screw axis 47, and a belt transmission mechanism configured by a belt 46 that is wound around between the pulleys 44 and 45. Note here that the rotation transmission mechanism 43 is not limited to such a belt transmission mechanism, and may be a gear transmission mechanism, a chain transmission mechanism, or others.

The ball screw axis 47 may be disposed in the vicinity of the substantial center of four sliding surfaces of the guide rail 22 and the slider 24 (the inner surface of the upper wall 24A of the slider 24, the inner surface of the lower wall 24D thereof, and the inner walls of the side walls 24B and 24C thereof). To be more specific, the ball screw axis 47 is disposed at substantially the center in the horizontally-oriented-U-shape inner space of the guide rail 22.

The universal joint 51 may allow a small displacement of the nut member 48 in the axis-orthogonal direction of the ball screw axis 47, and includes a joint main body and two linear bushes.

The linear bush may be provided with a spindle axis, and a sliding body that may freely slide smoothly along the spindle axis.

First of all, to the nut member 48, a first spindle axis is fixed in the horizontal direction being orthogonal to the ball screw axis 47, and a first sliding body that slides the first spindle axis is fixed to the joint main body. With such a configuration, the joint main body is allowed to be able to freely move only in the horizontal direction with respect to the nut member 48.

To the joint main body, a second spindle axis is fixed in the vertically downward direction being orthogonal to the ball screw axis 47, and a second sliding body that slides the second spindle axis is fixed to the slider 24. With such a configuration, the joint main body is allowed to freely move only in the vertical direction with respect to the slider 24.

With such a configuration, with respect to the slider 24, the nut member 48 is provided with the movement flexibility only in the vertical direction orthogonal to the ball screw axis 47 and the horizontal direction. That is, the nut member 48 becomes able to freely displace only in the axis-orthogonal direction of the ball screw axis 47 without rotating about the ball screw axis 47. This thus enables to move the slider 24 along the guide rail 22 while the swing rotation of the nut member 48 resulted from the straightness in the axis direction of the ball screw axis 47 is allowed, thereby allowing the slider 24 to move straight with a high accuracy.

Note here that the sliding member may be so configured as to tilt with respect to the axis direction of a spindle axis except for the axis-orthogonal surface (Y-Z plane) of the ball screw axis 47. Such a configuration may absorb any posture change occurred in the X-Y plane or X-Z plane of the nut member 48 as a result of the swing rotation of the nut member 48, thereby allowing the slider 24 to move straight with a higher accuracy.

Figure 6:
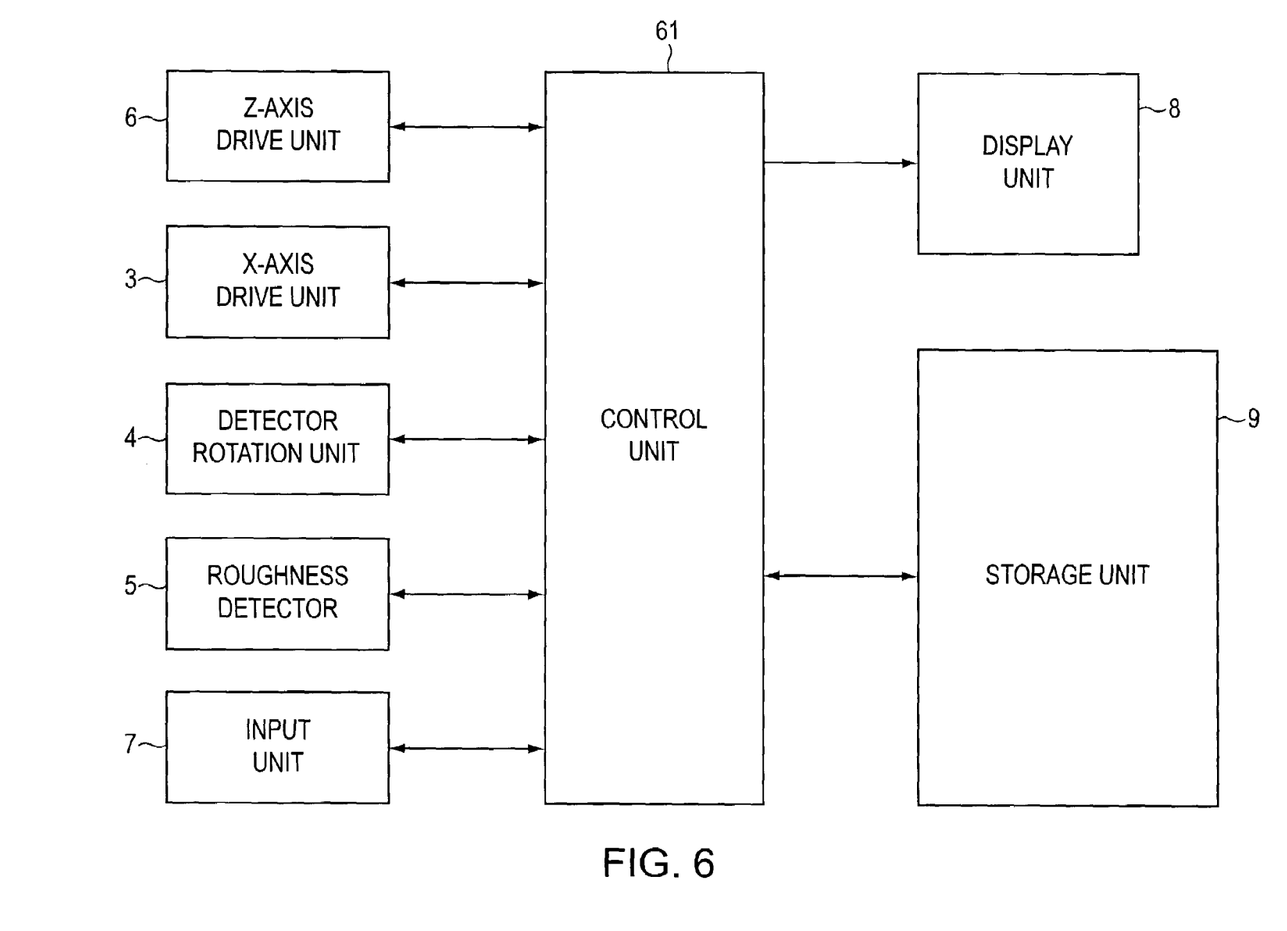
FIG. 6 is a block diagram showing an exemplary control unit.

FIG. 6 is a block diagram of a control unit. A control unit 61 may be connected with a Z-axis drive unit 6 that moves the X-axis drive unit 3 in the vertical direction, the X-axis drive unit 3, the detector rotation unit 4, the roughness detector 5, an input unit 7, a display unit 8, and a storage unit 9.

The input unit 7 may input various command information, including a measurement item selection command, a measurement start command, or the like.

The display unit 8 may display the measurement items, the measurement result, or the like.

The storage unit 9 may store an operation command program, measurement result, or the like in accordance with the measurement items.

At the time when the surface texture of a measurement work is measured, first of all, the measurement work is placed on the base 1 using a table or others. After the sensing pin 5B of the roughness detector 5 is touched to the surface of the measurement work, the roughness detector 5 is moved along the surface of the measurement work.

For example, the motor 42 provided to the X-axis drive unit 3 is rotated. In response, the rotation force of the motor 42 is transmitted to the ball screw axis 47 via the rotation transmission mechanism 43. Once the ball screw axis 47 is rotated, the nut member 48 screwed into the ball screw axis 47 moves forward or backward so that the slider 24 and the roughness detector 5 fixed to the nut member 48 move forward or backward (move) along the guide rail 22. Once the roughness detector 5 is moved along the surface of the measurement work, from any displacement observed to the sensing pin 5B (the stylus 5C) in the vertical direction, the surface roughness or others of the measurement work is detected.

Here, for changing of the orientation of the sensing pin 5B of the stylus 5C, a command is issued from the input unit 7 about the orientation of the sensing pin 5B. In response, the motor 11 provided to the detector rotation unit 4 is rotated. Once the motor is rotated, the rotation axis 14 is also rotated, and as a result, the roughness detector 5 is rotated. The rotation angle of the roughness detector 5 is detected by the angle detection sensor 16, and the resulting angle information is provided to the control unit 61. When the angle information provided by the angle detection sensor 16 is the same as the angle that is previously input, the control unit 61 stops driving of the motor 11. In this manner, the sensing pin 5B of the stylus 5C is set to any designated orientation.

By changing the orientation of the sensing pin 5B of the stylus 5C depending on the measurement portion of a measurement work, the following measurement may be implemented together with the downward measurement.

Figure 7:
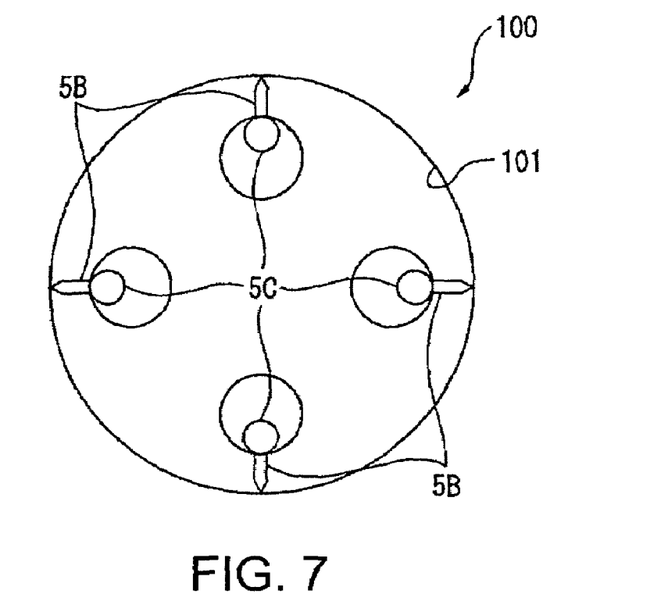
FIG. 7 is a diagram showing an example of measuring the inner surface of a hole.

FIG. 7 shows an example of measuring the surface roughness of the inner surface of a hole 101 of a measurement work 100. With the posture that the sensing pin 5B is oriented downward, the bottom side surface of the inner surface of the hole 101 may be subjected to the measurement operation. With the posture that the sensing pin 5B is oriented sideward, the side surface of the inner surface of the hole 101 may be subjected to the measurement operation, and with the posture that the sensing pin 5B is oriented upward, the top side surface of the inner surface of the hole 101 may be subjected to the measurement operation.

Figure 8:
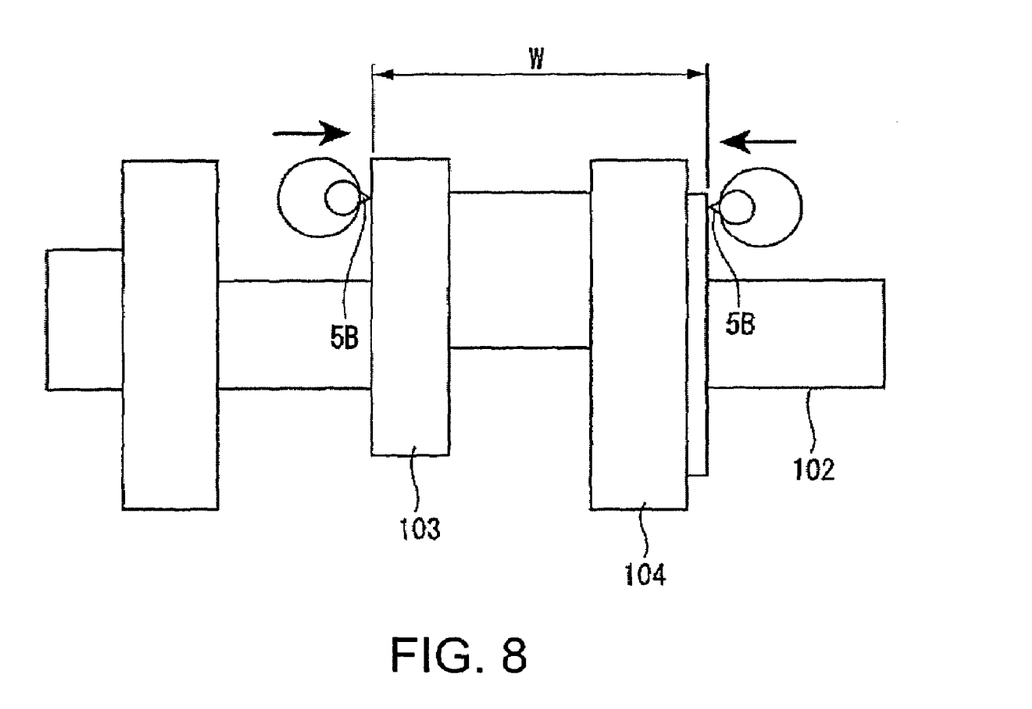
FIG. 8 is a diagram showing an example of measuring a width dimension between two flanges of a crankshaft.

FIG. 8 shows an example of measuring a width dimension W between two flanges 103 and 104 formed to a crankshaft 102. First of all, with the posture that the sensing pin 5B is oriented sideward, the outer surface of the flange 103 is measured. Thereafter, the sensing pin 5B is so rotated as to be in the opposite sideward posture, and the outer surface of the other flange 104 is measured. In this manner, the width dimension W between the two flanges 103 and 104 may be measured.

According to such an embodiment as above, the following effects may be achieved.

(1) With the detector rotation unit 4 that rotates the roughness detector 5 about an axis of the stylus 5C, the sensing pin 5B may be changed in orientation depending on the measurement portion of a measurement work. For example, the sensing pin 5B may be changed in orientation to direct downward, sideward, upward, diagonally upward or downward, or others. This thus possibly increases the measurement area so that any arbitrary position on the inner radius surface of a hole becomes available for roughness measurement.

(2) Because the ball screw axis 47 is disposed on the inner side of the guide rail 22 and inside of the slider 24 for driving the slider 24 that keeps hold of the roughness detector 5, the moment to be produced to the slider 24 may be suppressed to a further degree compared with conventional. Therefore, when the roughness detector 5 is moved, the posture change of the roughness detector 5 may be suppressed to possibly minimum so that the measurement may be performed with high accuracy for sure.

For example, the guide rail 22 is in the cross section of horizontally-oriented substantially-U-shape, the slider 24 is formed to configure a rectangular frame in cross section, and the ball screw axis 47 is disposed in the vicinity of the substantial center of four sliding surfaces of the guide rail 22 and the slider 24, i.e., disposed with friction force oriented. With such a configuration, the moment produced to the slider 24 is cancelled out, and the posture change of the roughness detector S may be suppressed with certainty.

(3) The guide rail 22 is formed with the two guide surfaces 23A and 23B, which are so disposed as to form a predetermined angle therebetween, being both parallel to the movement direction of the roughness detector S. The slider 24 is formed with the two sliding surfaces 25A and 25B, which are opposing to the two guide surfaces 23A and 23B. Therefore, any posture change observed in the direction orthogonal to these two guide surfaces 23A and 23B, and the sliding surfaces 25A and 25B, e.g., four directions of up and down, and right and left, may be suppressed to possibly minimum. Accordingly, even if the measurement is performed by changing the posture of the roughness detector 5, the straightness accuracy may be guaranteed while the posture change of the slider 24 is suppressed so that the measurement operation may be performed with accuracy.

(4) The biasing device 31 is each provided to surfaces opposite to the two sliding surfaces 25A and 25B of the slider 24. With such a configuration, the slider 24 is biased in such a manner that the two sliding surfaces 25A and 25B of the slider 24 follow the two guide surfaces 23A and 23B of the guide rail 22 so that the slider 24 is moved with reference to the guide surfaces 23A and 23B of the guide rail 22. Therefore, accurately assuring the straightness of the two guide surfaces 23A and 23B accordingly guarantees the straightness accuracy of the slider 24, i.e., the roughness detector 5.

(5) The biasing device 31 is configured to include the leaf spring 32 whose one end is fixed to the slider 24, the sliding members 26C and 26D retained by the other end of the leaf spring 32, and the biasing force adjustment mechanism 36 that is provided to the side opposite to the sliding members 26C and 26D with the leaf spring 32 therebetween, and is capable of adjusting the biasing force to be applied to the guide rail 22. With such a configuration, through adjustment of the biasing force of the biasing force adjustment mechanism 36, the pressure of the sliding members 26C and 26D abutting the guide rail 22 may be arbitrarily set. As such, through appropriate adjustment of the pressure of the sliding members 26C and 26D abutting the guide rail 22, the slider 24 may be made to slide smoothly along the guide rail 22.

(6) The slider 24 and the nut member 48 are coupled together via the universal joint 51 that allows a small displacement of the nut member 48 in the direction axis-orthogonal to the ball screw axis 47. With such a configuration, any effects caused by the swing rotation of the ball screw axis 47 may be absorbed by the universal joint 51, and are not transmitted to the slider 24. Also in this respect, the straightness accuracy may be guaranteed for the slider 24.

Note here that the present disclosure is not restrictive to the above-described embodiment, and numerous other modifications and variations devised for achieving the object of the present disclosure may be included in the present disclosure.

For example, in the above-described embodiment, the guide rail 22 is formed to have a cross section of horizontally-oriented substantially-U-shape, and the slider 24 is formed to configure a frame being rectangular in cross section to include the guide rail 22 therein. This is surely not restrictive, and the following shape will do.

Figure 9:
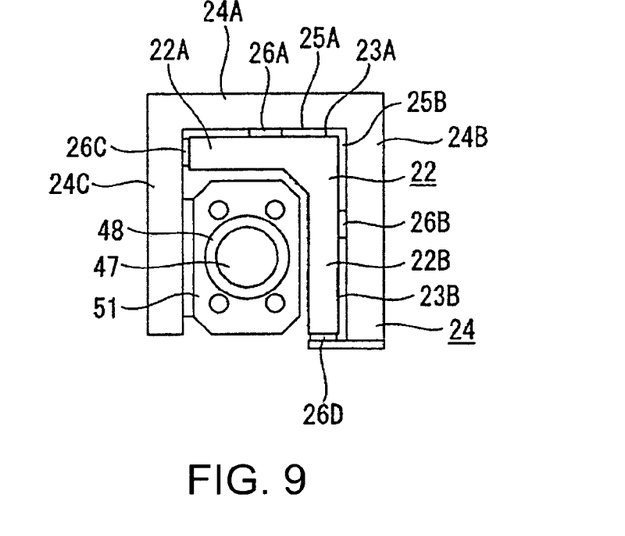
FIG. 9 is a cross sectional view of an exemplary modification of a guide rail and that of a slider.

FIG. 9 shows the guide rail 22 formed to have an L-shape in cross section, and the slider 24 formed to have a downwardly-oriented U-shape in cross section.

Such shapes may also lead to the effects similar to the above-described embodiment.

The configuration of the detector rotation unit 4 is not restrictive to the configuration described by referring to FIG. 2, and the following configuration will also do.

Figure 10:
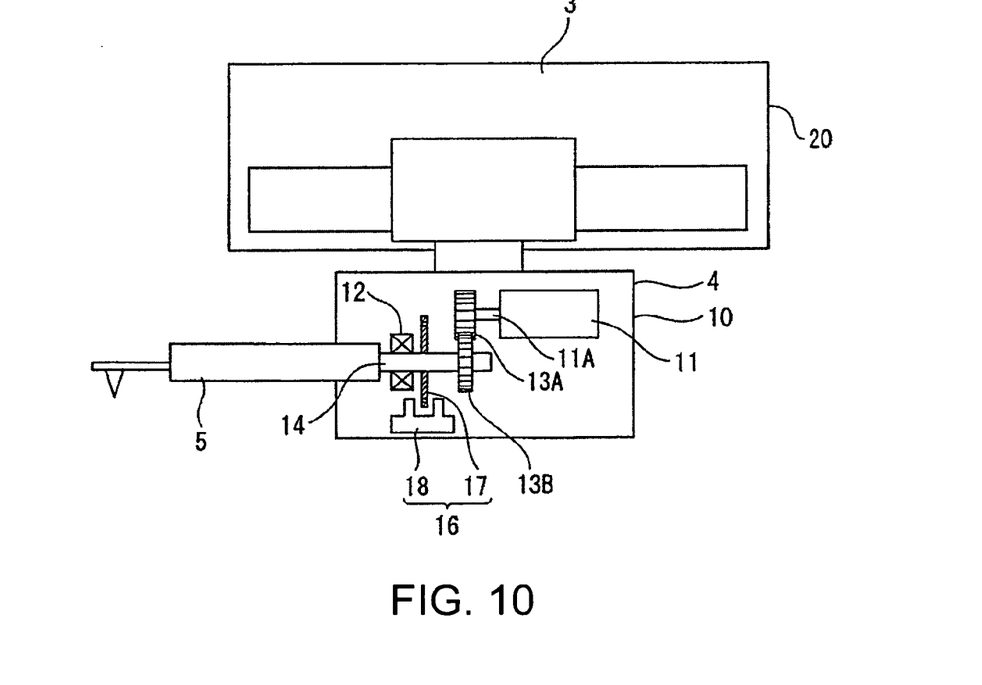
FIG. 10 is a schematic diagram of an exemplary modification of the detector rotation unit.
Figure 11:
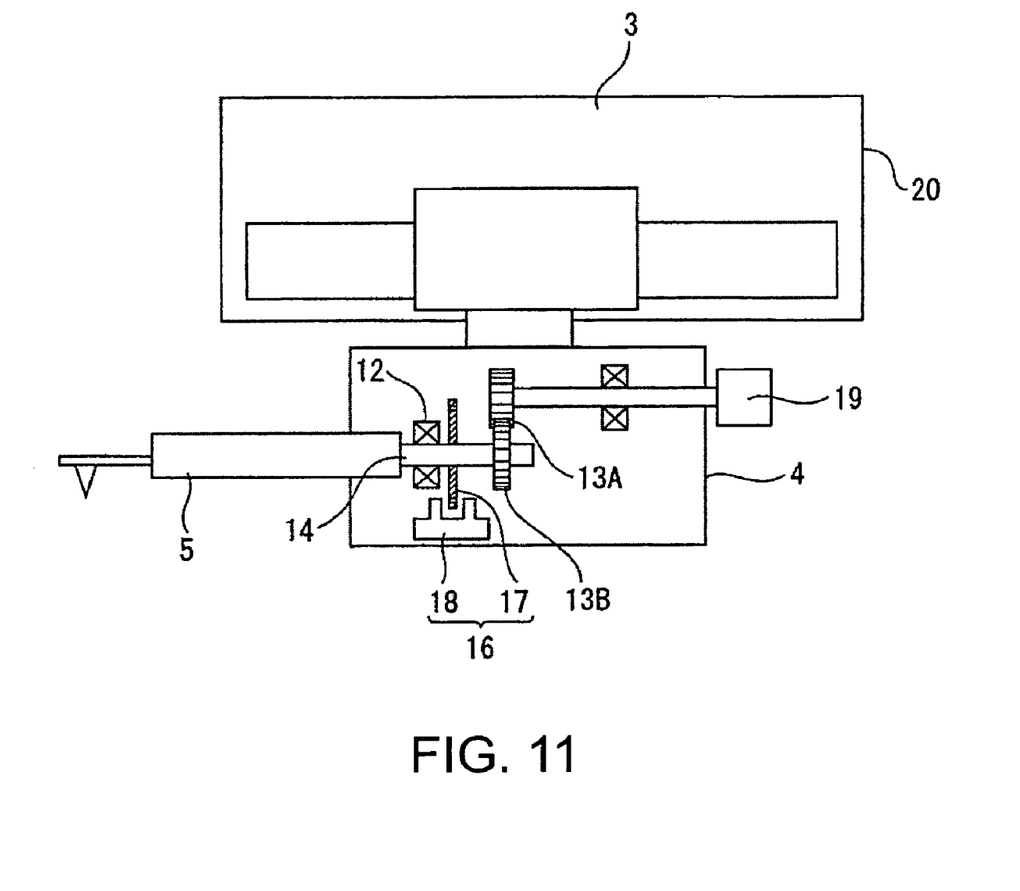
FIG. 11 is a schematic diagram of another exemplary modification of the detector rotation unit.

FIGS. 10 and 11 illustrate modification of a detection rotation unit. Compared with the detector rotation unit 4 of FIG. 2, the detector rotation unit 4 of FIG. 10 is different therefrom only in the respect that the rotation of the motor 11 is transmitted to the rotation axis 14 via two transmission gears 13A and 13B.

Compared with the detector rotation unit 4 of FIG. 10, the detector rotation unit 4 of FIG. 11 is different therefrom only in the respect that a manual knob 19 is provided as an alternative to the motor 11.

In the X-axis drive unit 3 of the above-described embodiment, the ball screw axis 47 is provided in line with the axis of the motor 42. This is surely not restrictive, and the ball screw axis 47 and the axis of the motor 42 may be disposed in series. Moreover, the drive device 41 may be provided with a decelerator or others so as to adjust the movement speed of the roughness detector 5.

The present disclosure is applicable to, in a surface roughness measuring instrument for measuring the surface roughness of a measurement work, and a contour measuring instrument for measuring the surface rising and falling, the contour, or others of a measurement work, a drive unit that moves such detectors along the surface of the measurement work.

While various details have been described, these details should be viewed as illustrative, and not limiting. Various modifications, substitutes, improvements or the like may be implemented within the spirit and scope of the foregoing disclosure.

What is claimed is:

1. A drive unit that moves a detector along a surface of a measurement work, comprising:
    a frame;
    a guide rail that is provided to the frame;
    a slider that is provided to be able to freely slide along the guide rail, and that holds the detector;
    a drive device that moves the slider along the guide rail, wherein the drive device includes a motor, a feed screw axis to be driven by the motor, and the feed screw axis is disposed on an inner side of the guide rail and inside of the slider.

2. The drive unit according to claim 1, wherein:
    the guide rail is provided with two external guide surfaces that are parallel to a movement direction of the detector, the two external guide surfaces having a predetermined angle therebetween; and
    the slider is provided with two internal sliding surfaces opposing the two external guide surfaces, and is formed to have a shape that houses therein the guide rail.

3. The drive unit according to claim 2, further comprising a biasing device that biases the slider toward the guide surfaces of the guide rail,
    wherein the biasing device is provided on a side surface of the slider opposite to one of the two internal sliding surfaces of the slider and includes:
    a leaf spring whose one end is fixed to the slider;
    a sliding member retained by the other end of the leaf spring and abutting the guide rail; and
    a biasing force adjustment mechanism that is provided on an opposite side of the sliding member with the leaf spring therebetween, applies biases in a direction in which the sliding member abuts the guide rail, and is capable of adjusting a biasing force.

4. The drive unit according to claim 1, further comprising a biasing device that biases the slider toward the guide surfaces of the guide rail.

5. The drive unit according to claim 1, wherein the drive device further includes a nut member that is screwed to the feed screw axis and coupled to the slider.

6. The drive unit according to claim 5, wherein:
    the slider and the nut member are coupled together via a universal joint that allows a small displacement of the nut member occurring in a direction axis-orthogonal to the feed screw axis.

7. The drive unit according to claim 1, wherein:
    the guide rail is formed to have a horizontally-oriented substantially-U-shape in cross section;
    the slider is formed to configure a rectangular frame in cross section of housing therein the guide rail, and four inner surfaces forming an end-surface rectangular frame are provided to be able to freely slide with respect to the guide rail; and
    the feed screw axis is disposed in a vicinity of a substantial center of four sliding surfaces between the guide rail and the slider in cross section.

8. The drive unit according to claim 1, wherein the detector includes:
    a detector main body;

a stylus that is supported by the detector main body to be able to freely swing, and is projecting a sensing pin at a tip end at substantially 90 degrees; and a detection section that detects a swing movement of the stylus, wherein a detector rotation mechanism is included to rotate the detector about an axis being substantially parallel to the movement direction of the detector.

* * * * *